(12) United States Patent
Dunn et al.

(10) Patent No.: US 9,336,818 B1
(45) Date of Patent: May 10, 2016

(54) METHOD FOR REDUCING ADJACENT TRACK INTERFERENCE EFFECTS IN A DATA STORAGE SYSTEM

(71) Applicant: HGST Netherlands B.V., Amsterdam (NL)

(72) Inventors: Tony Dunn, San Jose, CA (US); Yongchang Feng, Fremont, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/614,273

(22) Filed: Feb. 4, 2015

(51) Int. Cl.
| | | |
|---|---|---|
| *G11B 27/36* | (2006.01) | |
| *G11B 5/09* | (2006.01) | |
| *G11B 20/10* | (2006.01) | |
| *G11B 20/18* | (2006.01) | |
| *G11B 5/58* | (2006.01) | |

(52) U.S. Cl.
CPC .... *G11B 20/10472* (2013.01); *G11B 20/10388* (2013.01); *G11B 20/1816* (2013.01); *G11B 27/36* (2013.01)

(58) Field of Classification Search
CPC ...... G11B 5/58; G11B 5/09; G11B 20/10212; G11B 5/012; G11B 27/36; G11B 2220/90; G11B 2220/20; G11B 5/584; G11B 5/59627; G11B 5/596; G11B 5/59655

USPC .......... 360/31, 45, 75, 77.07, 77.08, 72.2, 25, 360/77.02, 77.01
See application file for complete search history.

(56) References Cited

U.S. PATENT DOCUMENTS

| | | |
|---|---|---|
| 8,102,613 B2 * | 1/2012 | Duan ................... G11B 5/012 360/31 |
| 8,120,866 B2 | 2/2012 | Che et al. |
| 8,331,053 B2 | 12/2012 | Hobbet |
| 8,531,793 B2 | 9/2013 | Bandic et al. |
| 2008/0174905 A1 | 7/2008 | Ueda |
| 2009/0244775 A1 | 10/2009 | Ehrlich |
| 2013/0185498 A1 | 7/2013 | Islam et al. |
| 2014/0016224 A1 | 1/2014 | Unoki et al. |

* cited by examiner

*Primary Examiner* — Nabil Hindi (57) ABSTRACT

A system and method is disclosed for improved operation of a data storage device such as a hard disk drive. The overhead for data rewriting may be reduced by the periodic remapping of logical block addresses to avoid excessive adjacent track interference effects on data blocks having lower data writing rates. It may employ the indirection system to remap data "hot spots" to new locations neighboring on spare data blocks. In circumstances where it is not possible to write data next to spare data blocks, the active LBA may be periodically moved after a predefined number of write operations.

10 Claims, 10 Drawing Sheets

| 1 | Spare - 511 | 501 |
| 2 | Data - 512 | 502 |
| 3 | Spare - 513 | 503 |
| 4 | Data - 514 | 504 |
| 5 | Spare - 515 | 505 |
| 6 | Spare - 516 | 506 |
| 7 | Spare - 517 | 507 |
| 8 | Spare - 518 | 508 |
| 9 | Data - 519 | 509 |
| 10 | Spare - 520 | 510 |

| 1 | Spare - 511 | 501 |
| 2 | Current Single-Sided ATI x1000 Data - 562 | 502 |
| 3 | Write x1000 - 563 | 503 |
| 4 | Current Double-Sided ATI x2000 Data - 564 | 504 |
| 5 | Write x1000 - 565 | 505 |
| 6 | Spare (ATI x1000 unimportant) - 566 | 506 |
| 7 | Spare - 517 | 507 |
| 8 | Spare - 518 | 508 |
| 9 | Data - 519 | 509 |
| 10 | Spare - 520 | 510 |

| 1 | Spare - 651 | 601 |
| 2 | Data - 652 | 602 |
| 3 | Spare - 653 | 603 |
| 4 | Data - 654 | 604 |
| 5 | Spare - 655 | 605 |
| 6 | Spare - 656 | 606 |
| 7 | Spare - 657 | 607 |
| 8 | Spare - 658 | 608 |
| 9 | Spare - 659 | 609 |
| 10 | Spare - 660 | 610 |
| 11 | Spare - 661 | 611 |
| 12 | Spare - 662 | 612 |
| 13 | Data - 663 | 613 |

FIG. 6    600

| | | |
|---|---|---|
| 1 | Spare - 651 | 601 |
| 2 | Current Single-Sided ATI x100 Data - 752 | 602 |
| 3 | Write x100 - 753 | 603 |
| 4 | Current Double-Sided ATI x200 Data - 754 | 604 |
| 5 | Write x100 - 755 | 605 |
| 6 | Spare (ATI unimportant) - 756 | 606 |
| 7 | Spare - 657 | 607 |
| 8 | Spare - 658 | 608 |
| 9 | Spare - 659 | 609 |
| 10 | Spare - 660 | 610 |
| 11 | Spare - 661 | 611 |
| 12 | Spare - 662 | 612 |
| 13 | Data - 663 | 613 |

FIG. 7   700

| 1 | Spare - 651 | 601 |
| 2 | Previous Single-Sided ATI x100 Data - 752 | 602 |
| 3 | Spare - 853 | 603 |
| 4 | Previous Double-Sided ATI x200 Data - 754 | 604 |
| 5 | Spare - 855 | 605 |
| 6 | Spare - 756 | 606 |
| 7 | Spare (ATI unimportant) - 857 | 607 |
| 8 | Write x100 from track 3 - 858 | 608 |
| 9 | Write x100 from track 5 - 859 | 609 |
| 10 | Spare (ATI unimportant) - 860 | 610 |
| 11 | Spare - 661 | 611 |
| 12 | Spare - 662 | 612 |
| 13 | Data - 663 | 613 |

FIG. 8    800

| 1 | Spare - 651 | 601 |
| 2 | Previous Single-Sided ATI x100 Data - 752 | 602 |
| 3 | Spare - 853 | 603 |
| 4 | Previous Double-Sided ATI x200 Data - 754 | 604 |
| 5 | Spare - 855 | 605 |
| 6 | Spare - 756 | 606 |
| 7 | Spare - 857 | 607 |
| 8 | Now Spare - 958 | 608 |
| 9 | Spare (ATI unimportant) - 959 | 609 |
| 10 | Write x100 from track 8 - 960 | 610 |
| 11 | Write x100 from track 9 - 961 | 611 |
| 12 | Spare (ATI unimportant) - 962 | 612 |
| 13 | Data - 663 | 613 |

METHOD FOR REDUCING ADJACENT TRACK INTERFERENCE EFFECTS IN A DATA STORAGE SYSTEM

TECHNICAL FIELD

The present invention relates to data storage devices and in particular to data storage devices having physical data storage locations in close proximity with widely differing rates of data writing.

BACKGROUND

Data storage devices employ rotating data storage media such as hard disk drives. In a hard drive, data is written to the disk medium using a write head which generates a high localized magnetic field which aligns magnetic domains within the disk in one of two directions. In some cases, the magnetization direction is up or down relative to the plane of the disk (perpendicular magnetic recording, or PMR). In other cases, the magnetization direction is within the plane of the disk. In all cases, this data may then be read-out with a read head. The write and read heads are typically integrated within a single assembly. To achieve steadily increasing data storage densities (typically measured in bits/inch$^2$), which are now achieving levels near $10^{12}$ bits/in$^2$, the sizes of magnetic regions storing individual bits have been reduced to nm levels.

To achieve these increasing data storage densities, the dimensions (widths) of data tracks are being steadily decreased and the track-to-track spacings also reduced correspondingly, with the result that magnetic interference effects between neighboring tracks (adjacent track interference, ATI), and nearby tracks (far track interference, FTI) are becoming an increasing problem for the maintenance of data integrity. The current solution to this problem is to monitor the total number of writes on any given track and in idle time (i.e., in periods during which the host computer is not transmitting read or write commands to the HDD), execute a background media scan. During the background media scan, lower levels for correction (i.e., fewer error-correction code bits) are used—if the track can be read but is compromised, it is refreshed (i.e., the same data is rewritten into that same physical location on the disk medium). The time required for these data readout and rewriting operations may affect the overall performance of the HDD and is undesirable.

Thus it would be advantageous in a data storage system to provide a method for improved control of ATI and FTI effects with reduced overhead on HDD operation, thereby improving the overall performance of the HDD.

It would also be advantageous to provide a method for avoiding ATI and FTI effects on data blocks, thereby reducing or eliminating the need to rewrite the same data into these data blocks, with the corresponding overhead on HDD operation.

A further advantage would be to provide a method for remapping logical block addresses (LBAs) from one physical data location to another physical data location to effect a reduction in "hot spots" on the disk storage medium at which very high and continuing rates of data writing are occurring.

SUMMARY

Some embodiments provide methods for improved data storage (reading and writing) in a hard disk drive or other data storage device having data storage locations in close proximity to each other and with widely differing rates of data writing. The close proximity of these storage locations may induce magnetic interference effects (adjacent track interference, ATI, or far track interference, FTI), causing reductions in the magnetization of data bits, and consequently a need to use more error correction code bits during data readout. When increased numbers of error bits are required, the data decoding algorithm will be slower, leading to a reduction in HDD readout performance.

Other embodiments provide a method for improved control of ATI and FTI effects with reduced overhead on HDD operation, thereby improving the overall performance of the HDD.

Some embodiments provide a method for avoiding, or substantially reducing, ATI and FTI effects on data blocks, thereby reducing or eliminating the need to rewrite the same data into these data blocks, with the corresponding overhead on HDD operation.

Still other embodiments provide a method for remapping logical block addresses (LBAs) from one physical data location to another physical data location to effect a reduction in "hot spots" on the disk storage medium at which very high and continuing rates of data writing are occurring.

DETAILED DESCRIPTION

Embodiments can provide one or more advantages over previous methods for reducing the loss of data due to adjacent track interference (ATI). Some benefits may also be utilized to reduce the effects of far track interference (FTI). Not all embodiments may provide all the benefits. The embodiments will be described with respect to these benefits, but these embodiments are not intended to be limiting. Various modifications, alternatives, and equivalents fall within the spirit and scope of the embodiments herein and as defined in the claims.

Data Storage System

Figure 1:
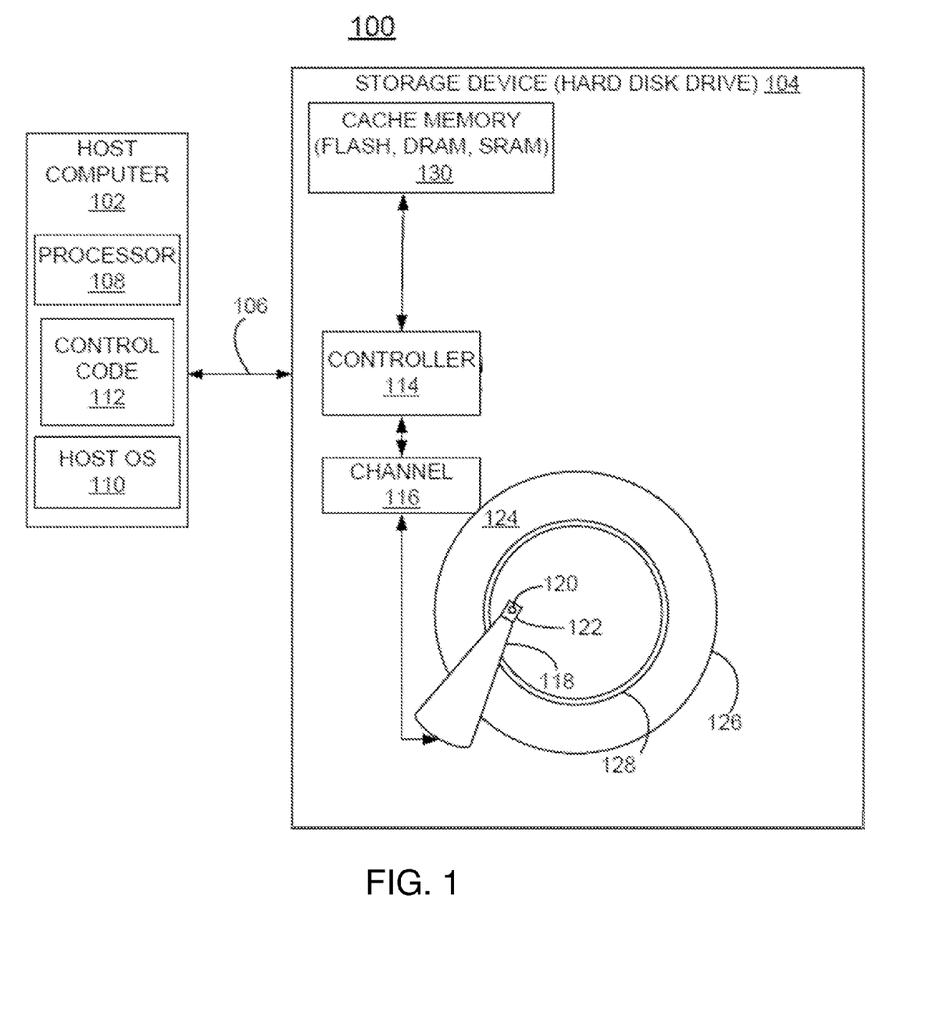
FIG. 1 is a schematic diagram of an embodiment of a data storage system.

FIG. 1 is a schematic diagram of an embodiment of a data storage system 100. System 100 includes a host computer 102, a storage device 104, such as a hard disk drive, and an interface 106 between the host computer 102 and the storage device 104. Host computer 102 includes a processor 108, a host operating system (OS) 110, and control code 112. The storage device or hard disk drive 104 includes controller 114 coupled to a data channel 116. The storage device 104 includes an arm 118 carrying a read/write head including a read element 120 and a write element 122.

In operation, host operating system 110 in host computer 102 sends commands to storage device 104. In response to these commands, storage device 104 performs requested functions such as reading, writing, and erasing data, on disk surface 124. Controller 114 causes write element 122 to record magnetic patterns of data on a writable surface of disk 124 in tracks 128. The controller 114 positions the read head 120 and write head 122 over the recordable or writable surface 124 of disk 126 by locking a servo loop to predetermined servo positioning burst patterns, typically located in servo spokes or zones. The predetermined servo positioning pattern may include a preamble field, a servo sync-mark (SSM) field, a track/sector identification (ID) field, a plurality of position error signal (PES) fields, and a plurality of repeatable run out (RRO) fields following the burst fields.

In accordance with some embodiments of the invention, system 100 includes a cache memory 130, for example, implemented with one or more of: a flash memory, a dynamic random access memory (DRAM), or a static random access memory (SRAM).

System 100 including the host computer 102 and the storage device or hard disk drive 104 is shown in simplified form sufficient for understanding. The illustrated host computer 102 together with the storage device or hard disk drive 104 is not intended to imply architectural or functional limitations. The present invention may be used with various hardware implementations and systems and various other internal hardware devices.

Notation in the Schematic Diagrams of FIGS. 2 Through 9

Figure 2:
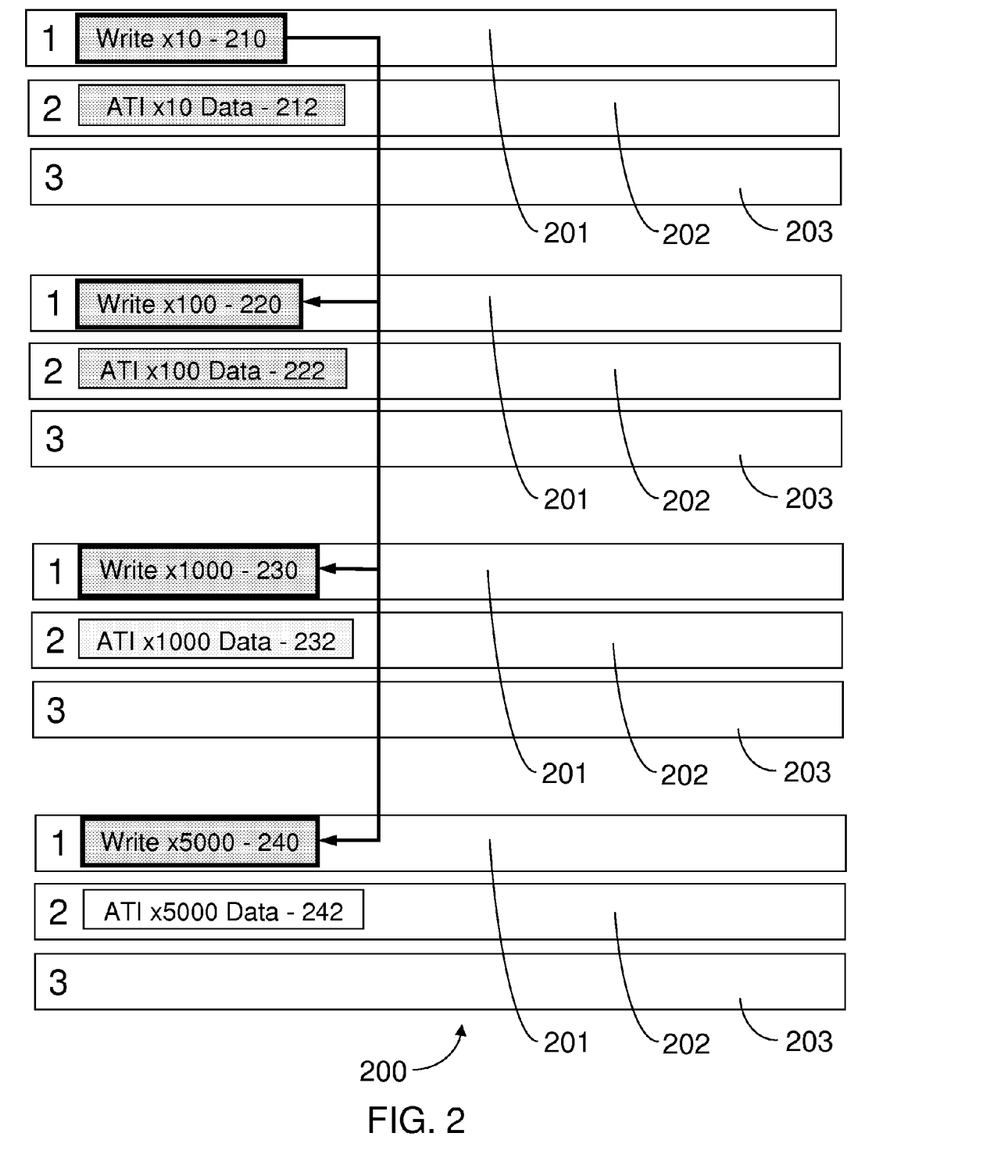
FIG. 2 is a schematic diagram of a writing process on a hard disk drive not embodying the present invention, illustrating the partial erasing of data due to adjacent track interference (ATI)
Figure 3:
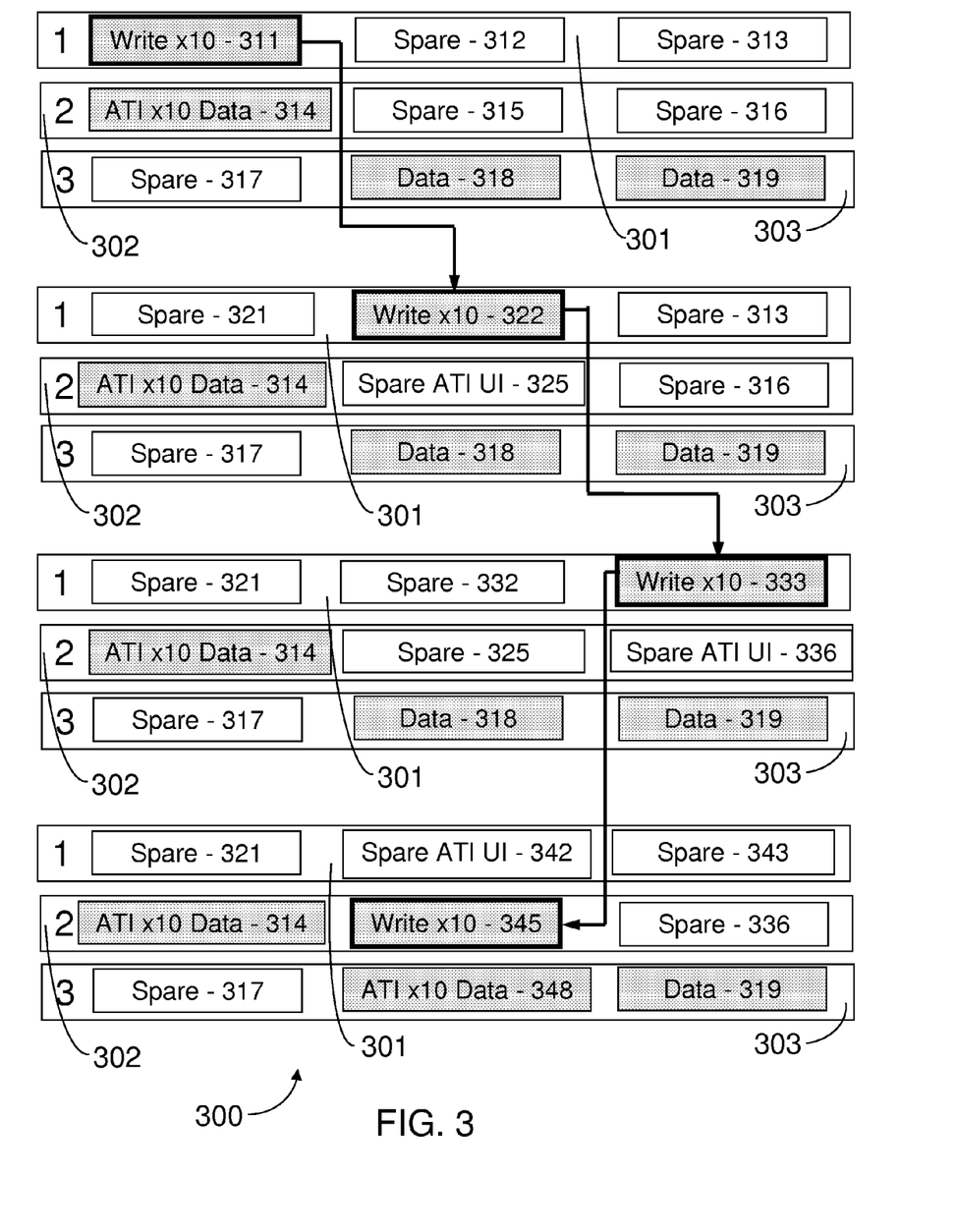
FIG. 3 is a schematic diagram of an improved writing process according to an embodiment of the invention with smaller data blocks.
Figure 4:
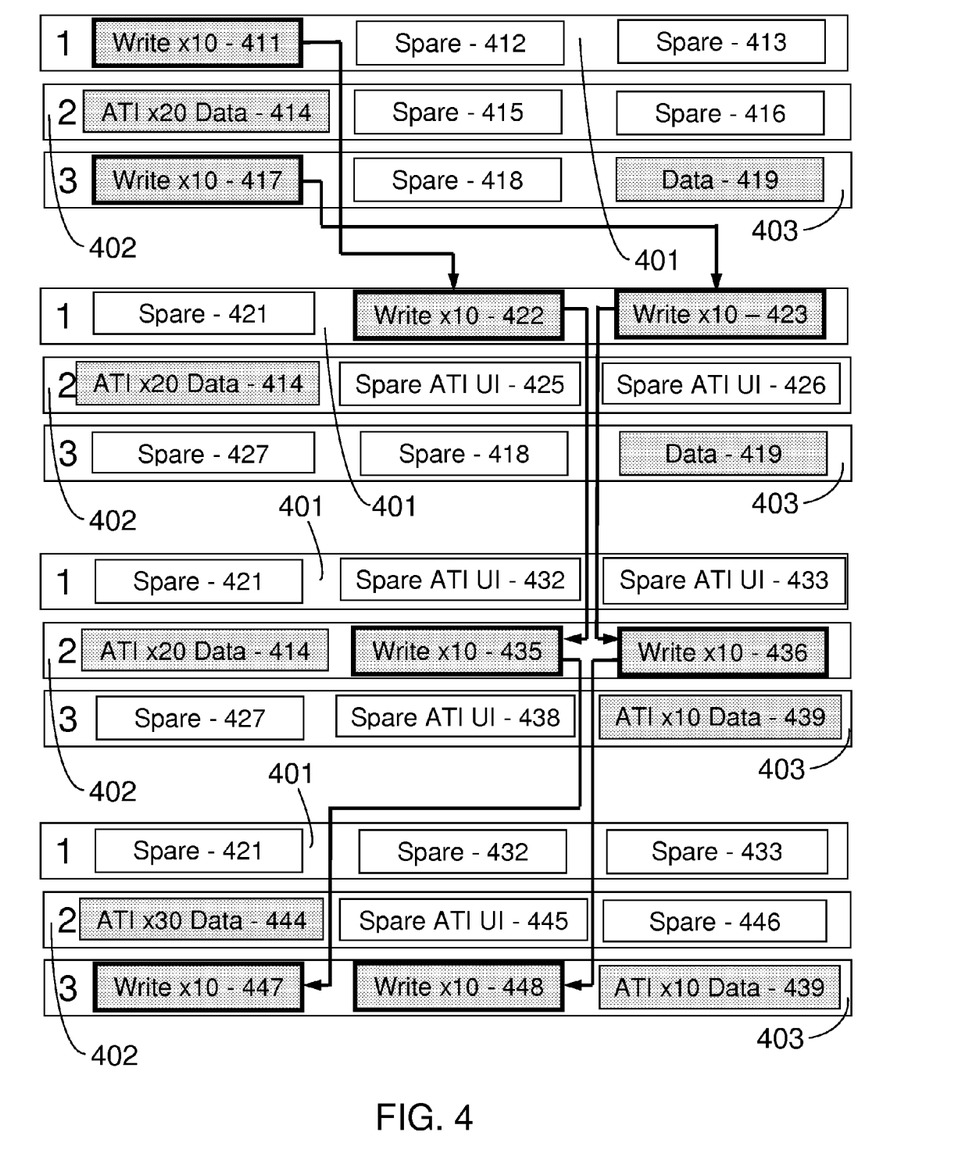
FIG. 4 is a schematic diagram of an improved writing process according to an embodiment of the invention with smaller data blocks and double-sided ATI squeeze.

FIGS. 2 through 9 are schematic diagrams of various writing processes both in the absence and the presence of embodiments of the present invention. A standard notation has been employed in these figures to facilitate the understanding of the various advantages of data writing processes, and how these improved writing processes differ from previously-employed writing processes. In FIGS. 2-9, data storage tracks on a hard drive data storage device are represented by horizontal rectangles, such as tracks 201, 202 and 203 in FIG. 2, or tracks 601-613 in FIGS. 6-9. At the far left of these track representation rectangles, track numbers, such as "1" for track 201, and "2" for track 202 in FIG. 2, are shown. In current hard disk drives, the numbers of tracks may range up into the hundreds of thousands (e.g., 300,000), wherein each track may comprise at least hundreds of sectors (in some cases up to 1000), and wherein each sector may contain up to 4 kB of data, or more. Details of the numbers of tracks, sectors, and bytes within sectors are not part of the present invention. In FIGS. 2-4, smaller data blocks are shown as smaller rectangles within the tracks—for example data block 210 in track 201 in FIG. 2. In FIGS. 5A-9, larger data blocks are shown as larger rectangles within the tracks—for example data block 511 in track 501 in FIG. 5A. If a data block contains data, either written currently (i.e., within the time period represented by the figure) or written previously, then this data block will be shown shaded. The darkness of the shading represents the "strength", or degree of magnetization, of the data bits within that data block—so, for example, in FIG. 5B, data blocks 503 and 505 are currently being written and thus the data is "strong" so the shading of blocks 503 and 505 is darker. In comparison, data block 564 represents data that has been partially erased due to double-sided adjacent track interference (ATI) arising from the writing of neighboring data blocks 503 and 505, and thus the shading of block 564 is lighter. When data is being currently written into a data block, that block is shown with a darker outline—for example, block 210 in FIG. 2, or block 563 in FIG. 5B.

Blocks containing previously-stored data contain the word "Data". Blocks currently being written also contain data, but the word "Write" is used instead to indicate that this data is being written within the time period represented by that figure, and was not there before the time period represented by the figure. If a block is being written, this indicates that the indirection system has mapped that physical location (track and sector, or groups of sectors) to a logical block address (LBA). Spare data blocks are not mapped to an LBA and thus cannot receive written data. If a data block (large or small) contains the abbreviation "ATI" this signifies that it is either currently experiencing some degree of adjacent track interference (in which case the data block may also contain the word "Current"), or that this data block had previously experienced some ATI effects (in which case the data block may also contain the word "Previous"). Depending on the number of ATI events that the data has encountered, the degree of loss in signal strength may range from negligible to being serious enough to result in the loss of some or all of the data stored in that data block (i.e., even with complex error-correction code (ECC) processes employing all the error bits, the data still cannot fully be recovered). In all cases, the degree of loss in signal strength may be characterized by the number of error correction bits required for the data read-out process. In other words, "strong" data (i.e., data which has experienced minimal or no ATI) may require only eight ECC bits, whereas degraded ("weak") data may require the use of 12, 16, or even more ECC bits. The disadvantage in reading "weak" data is that the read-out process may be substantially slowed down by the need for higher levels of error correction, thereby reducing the data read-out rate of the HDD. Within a data block, the abbreviation "UI" stands for "unimportant", and is always used in conjunction with the abbreviation "ATI" (see above). ATI is only "unimportant" when there is no data within a data block—adjacent track interference cannot degrade data if there is no data to degrade. Data blocks denoted "Spare" do not currently contain any user data—this does not imply that they have not been previously-written; it only indicates that whatever data had ever been written in that data block has subsequently already been rewritten into another data block, possibly according to methods of the present invention. When the indirection system moves data out of a first block to a second block, this corresponds to a remapping of the LBA from the first block to the second block.

Within some data blocks, a notation such as "×10" or "×1000" is shown. For data blocks also containing "Write", "×10" would be the number of data writing cycles which occurred during the time period represented by that particular figure—see data block 210 in FIG. 2. For data blocks also containing "Data", "×10" would represent the number of erasing ATI events which have affected the data within that data block—as for data block 212 in FIG. 2. In some figures, arrows indicate the flow of data, i.e., how a particular Logical Block Address (LBA) is remapped to different physical addresses (Data Blocks) according to embodiments.

Figure 7:
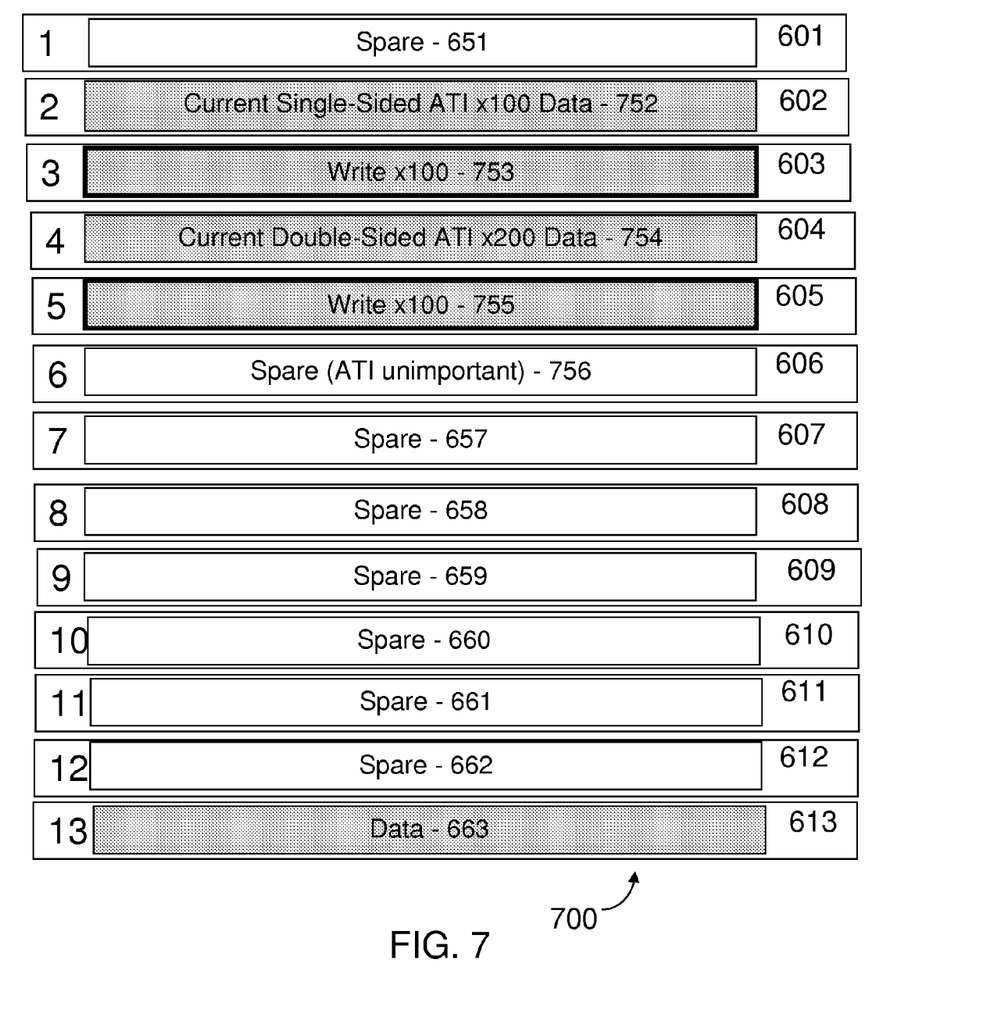
FIG. 7 is a schematic diagram of an improved writing process according to an embodiment of the present invention showing minimized ATI effects on the pre-existing data.
Figure 8:
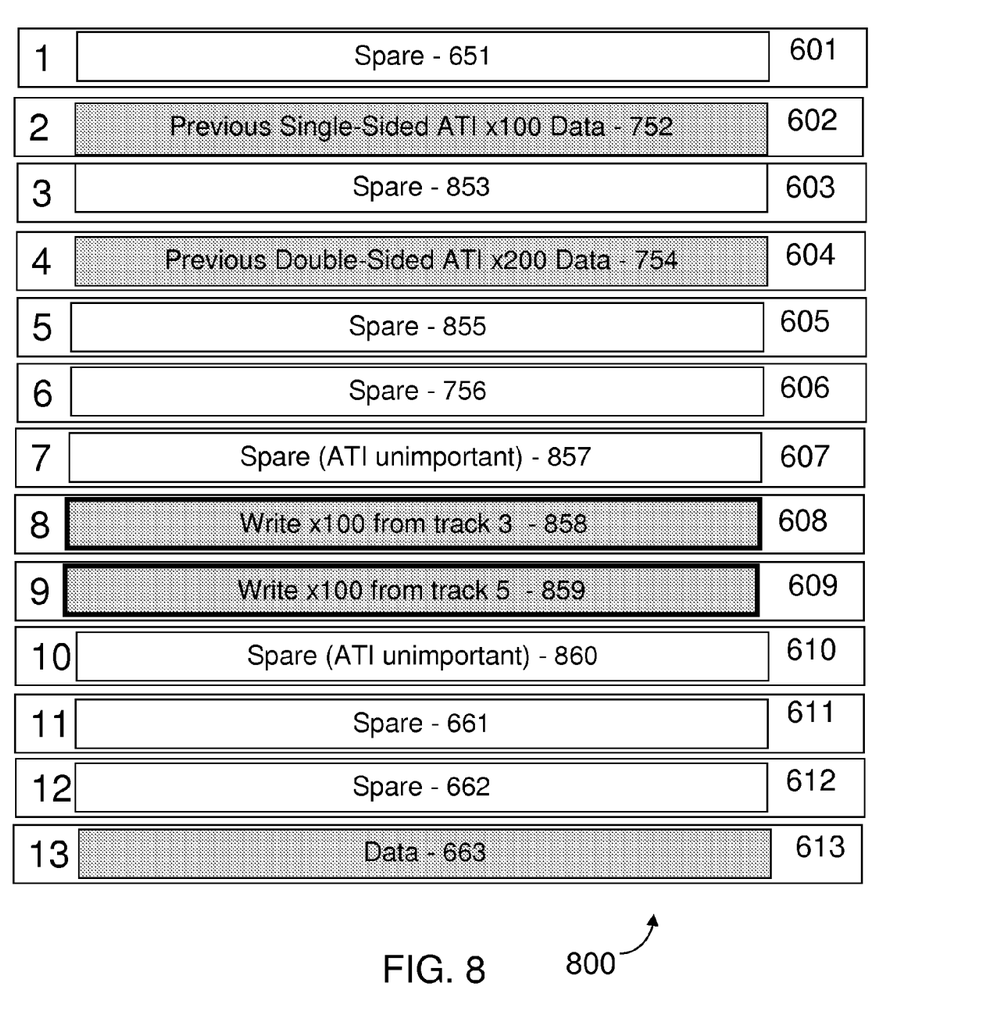
FIG. 8 is a schematic diagram of the improved writing process from FIG. 7 showing minimized ATI effects on the pre-existing data.

Data blocks have numeric labels (such as data block 210 in the upper left of FIG. 2) which indicate three things: (1) the physical location (i.e., the track, and the sector or group of sectors) of the data block, (2) the specific data or absence of data already stored or currently being written, into the data block, and (3) the degree of ATI erasing which may have occurred. Thus in FIGS. 2-9, the same physical location of a data block within a track and sector may have differing labels as new data is written into that data block, or as that data block is affected by ATI during writing of new data into one or both neighboring data blocks. Also, even if a data block is not rewritten within a figure, if that data block encounters ATI effects resulting in a significant weakening of the data (partial demagnetization of the data bits), its data block number will also change. As an example, compare FIGS. 7 and 8: data blocks 752 and 754 appear in both these figures since their physical location and the data stored there do not change, whereas data block 753 in FIG. 7 is being written a hundred times ("×100") while that same data block in FIG. 8 is now a spare (labelled "853") because the logical block address which had previously been mapped to location 753 is now mapped to block 858. Another example is the sequence of data blocks 212, 222, 232, and 242 in FIG. 2, representing a data block with the same previously-written data which is progressively weakened by ATI effects from the writing in data blocks 210 to 240.

ATI Problem with Fixed Writes for Smaller Data Blocks

FIG. 2 is a schematic diagram 200 of a writing process on a hard disk drive illustrating the partial erasing of data due to adjacent track interference (ATI) in a writing process in the absence of the present invention. Three tracks 201, 202 and 203 are shown repeated four times to represent a time sequence from the top to the bottom of FIG. 2—over this time sequence the data block initially labelled 210 has data written in it ten times ("×10"), and then at a later period data has been written into this same data block a hundred times ("×100")— since this may not be the same data, the same data block has been relabeled "220", thus the data block notation indicates both a physical location (track and sector or group of sectors) and also the data or absence of data already stored or currently being written there. At a still later period in time, this same data block has had data written into it a thousand times ("×1000"), and again since this may not be the same data, the data block has been relabeled "230". Finally, at the bottom of the figure data has now been written into this same data block five thousand times ("×5000") and the data block has been relabeled "240"). The data block neighboring this data block being written contains previously-written data which is assumed in FIG. 2 to not be subsequently rewritten into during the time period represented by FIG. 2. This means that the magnetic storage medium in track 202 is subjected to repeated adjacent track interference (ATI) events without any data refresh operations being performed. As a result, it is likely that the stray magnetic fields emanating out the sides of the write head during the write operations occurring for block 210 will weaken data block 212, and writing in data block 220 will weaken data block 222, writing in data block 230 will weaken data block 232, and finally writing in data block 240 will weaken data block 242. The progressively lighter shading of data blocks 212, 222, 232, and 242 denotes this weakening, which would be indicated by a progressive need to employ higher numbers of ECC error bits, thereby necessitating longer data readout times. By the time represented by the fourth set of tracks 201-203 at the bottom is reached, data block 242 may have become unreadable, with the loss of user data which was written into that data block prior to the time period represented by FIG. 2. Clearly this figure represents an undesirable, or even unacceptable, outcome which may be prevented with the improved writing method. Over the time period of FIG. 2, no reassignment of logical block addresses (LBAs) has been made, thus the data mapped to the LBA corresponding to data block 210 is also written to data blocks 220, 230, and 240 resulting in a "hot spot" of excessively high levels of writing, with the resulting degradation of the data in the neighboring LBA represented by data blocks 212, 222, 232, and 242. Although the actual data stored in blocks 212, 222, 232, and then 242 should be the same, the progressive weakening, and possibly even the loss of, this data is indicated by the gradually diminishing shading and by the renumbering of the data block as the magnetization is slowly reduced.

Reduction or Elimination of ATI Using Writing Methods According to Some Embodiments for Smaller Data Blocks FIG. 3 is a schematic diagram 300 of an improved writing process according to an embodiment of the invention with smaller data blocks. Four repetitions of tracks 301-303 are illustrated, representing four sequential periods within the time frame of FIG. 3. A particular logical block address (LBA) is initially mapped to data block 311, and then remapped to data block 322, then remapped to data block 333, and finally remapped to data block 345. This sequential remapping may be executed by the indirection system according to embodiments of the invention to prevent the excessive ATI effects shown in FIG. 2, and thus to preserve previously-stored data in neighboring data blocks. For example, data block 314 encounters only ten ATI events before the LBA initially mapped to block 311 is remapped to block 322. Data block 325 is a neighbor of block 322, but since block 325 does not contain data, it is labelled "Spare ATI UI", indicating that it is "Spare" (i.e., contains no data), it has encountered ATI effects, and these ATI effects are unimportant ("UI") because it is spare. The LBA mapped to block 322 is remapped to block 333 after ten writes ("×10") because the other neighboring block (not shown) to block 322 may contain data. Many data blocks in FIG. 3 are spare, for example blocks 312, 313, 315, 316, 317, 321, 325, 332, 336, 342, and 343—this means that these physical blocks are not mapped to LBAs within at least portions of the time period represented by FIG. 3. There are also a number of blocks containing previously-stored data, such as blocks 314, 318, 319, and 348, where the data is not rewritten within the time period of FIG. 3 (however these data blocks remain mapped to the same LBAs throughout FIG. 3, i.e., they are never spares within FIG. 3). A data block will maintain the same label if it remains unchanged by either writing or ATI effects. So for example, spare block 317 is shown four times, top to bottom, never being written into and never being affected by ATI. Conversely, the physical address represented first by data block 312 ("Spare"—i.e., not mapped to an LBA) is then written into (after being mapped to an LBA) and relabeled 322. Next the same physical location is unmapped from that LBA, now becoming spare data block 332, and finally that spare data block is affected by ATI to be again relabeled 342 at the bottom of FIG. 3 (although still unmapped to any LBA). Data block 314 is initially affected by ATI during the writing of block 311, and then remains unaffected by any subsequent ATI events, thus maintaining the label 314 to the bottom of FIG. 3.

FIG. 4 is a schematic diagram 400 of an improved writing process according to one embodiment of the invention with smaller data blocks and double-sided ATI squeeze. Four repetitions of tracks 401-403 are illustrated, representing four sequential periods within the time frame of FIG. 4. Spare data blocks 412, 413, 415, 416, 418, 421, 425, 426, 427, 432, 433, 438, 445, and 446, are illustrated—these blocks represent physical locations which are not mapped to LBAs within at least portions of the time period of FIG. 4. Blocks 414, 419, 439, and 444 contain previously stored data which is not re-written during the time period represented by FIG. 4—these blocks are mapped to the same LBAs throughout FIG. 4. At the top left of the figure, data is being written ten times into both blocks 411 and 417, resulting in a "double-squeeze" of the data previously stored in block 414—this is indicated by the notation "ATI ×20 Data", where the "×20" shows the combined ATI data erasing effects of "×10" ATI from block 411 and "×10" ATI from block 417. In this "double-squeeze" scenario, the rate of erasing of data due to ATI effects is doubled in block 414. The method can prevent the loss of data in block 414 by changing the mapping of the LBA initially corresponding to block 411 to block 422 (as indicated by the arrow), and also by changing the mapping of the LBA initially corresponding to block 417 to block 423 (as indicated by the arrow). Once this remapping has occurred, possibly using an indirection system of the HDD modified according to embodiments of the invention, no further ATI events occur within block 414—thus in the four repetitions of tracks 401-403, this previously-stored data block retains the label "414" (and also retains its original LBA mapping).

As shown in FIG. 4, the LBA mapping which originally went to block 411 is first moved to block 422, then to block 435, and finally to block 447, in all cases after a predetermined write count is reached—in this example, ten writes ("×10"). Similarly, the LBA mapping which originally went to block 417 is first moved to block 423, then to block 436, and finally to block 448, in all cases after the predetermined write count has been reached—in this example, ten writes ("×10"). If a neighboring data block is unmapped to an LBA, it is "Spare", such as block 415. To indicate the ATI effects on block 415 it is subsequently relabeled "425" when data is written into neighboring block 422 (after it is changed from "Spare" 412 to "Write ×10" 422)—this shows that the block numbering may change to indicate ATI effects on a block not containing data, even though these ATI effects are unimportant due to the lack of stored data.

An interesting example is block 444, where the data has not been rewritten throughout FIG. 4, however three different ATI events affect the data stored in this same physical data block (with the same LBA mapping). At the top of FIG. 4, two ATI events combined give an "ATI ×20" condition, and then later at the bottom, a further "ATI ×10" event occurs due to the writing of data into neighboring block 447—the result is that now block 444 has encountered thirty ATI events. Thus the method can allow for the combination of multiple ATI events by allowing a margin of error—for example if it is known that fifty ATI events are sufficient to induce some weakening of data in a block which is not rewritten, then the number of write cycles in neighboring blocks (shown here as ten) needs to be enough smaller so that with multiple write cycles, the total number of ATI events will still be below the maximum acceptable number (i.e., fifty in this example).

ATI Problem with Fixed Writes for Larger Data Blocks for Data Storage Systems without Embodiments In some cases, data blocks containing many sequential sectors, in some cases even containing all the sectors within a track, may be mapped to a single LBA and thus written in one long write operation. Examples of this possibility are illustrated in FIGS. 5A-9.

Figure 5A:
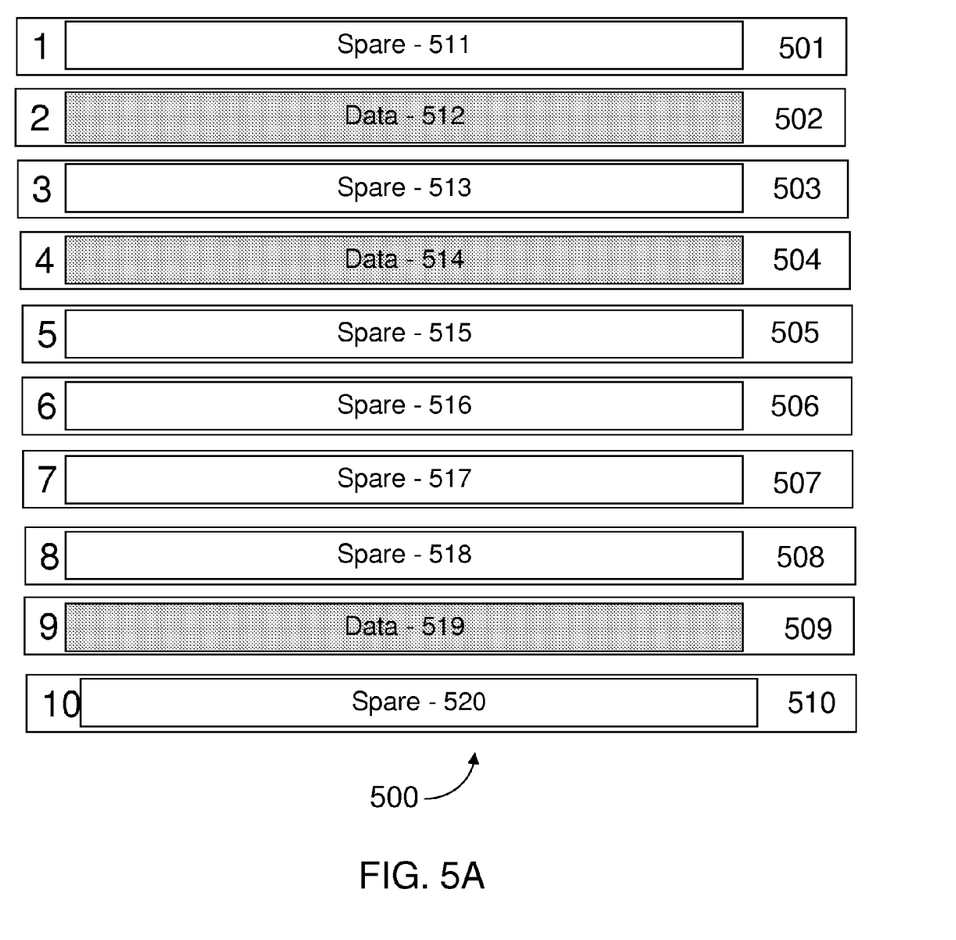
FIG. 5A is a schematic diagram of a writing process in the absence of the present invention showing pre-existing data.

FIG. 5A is a schematic diagram 500 of a writing process in the absence of the invention showing pre-existing data. Spare data blocks 511, 513, 515-518, and 520 are shown, along with blocks 512, 514 and 519 containing previously-stored data which is not rewritten during the time frame of FIG. 5A. FIG. 5A represents the condition of the data storage medium prior to the write operations illustrated in FIG. 5B.

Figure 5B:
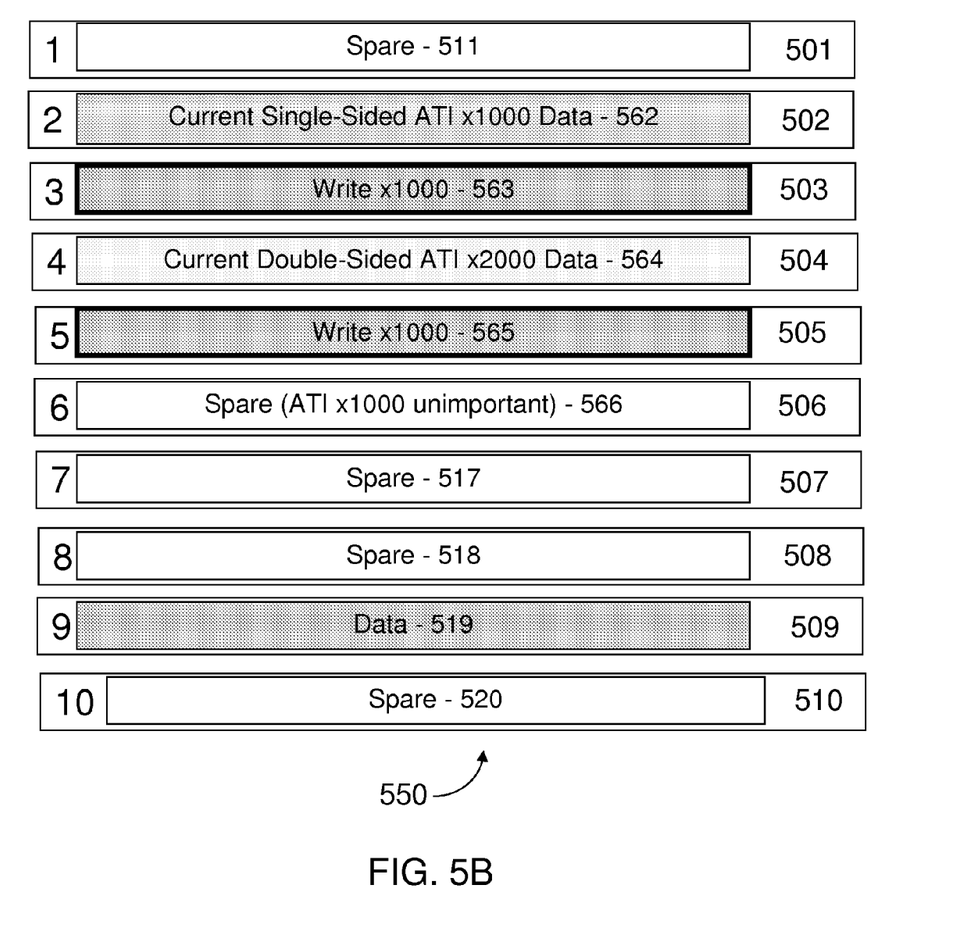
FIG. 5B is a schematic diagram of a writing process in the absence of the present invention showing ATI effects on the pre-existing data.

FIG. 5B is a schematic diagram 550 of a writing process illustrating the partial erasing of data due to adjacent track interference (ATI) in a writing process in the absence of the present invention. Data blocks 563 and 565 are now mapped to LBAs and experience a thousand write operations ("×1000"). As a result, the previously-written data in block 562 has been degraded substantially by single-sided ATI. Block 564 encounters twice the number of ATI erasure events (double-sided ATI) since it is between blocks 563 and 565—this is indicated by the near elimination of shading in the figure, denoting a substantial magnetic weakening, and even possible loss of the readability, of this data. Block 566 encounters a thousand ATI events also, but since block 566 is unmapped to an LBA and thus is "Spare" and without data, the thousand ATI events that block 566 is exposed to are unimportant. Blocks 517-520, which are farther away from tracks 563 and 565 are unaffected by the write operations illustrated here—this assumes less importance of far track interference (FTI), which may affect data stored in tracks as far as 30 tracks on either side of the track being written into. Embodiments of the method of the present invention may be used to correct for FTI as well as ATI.

Reduction or Elimination of ATI Using Writing Methods for Larger Data Blocks

Figure 6:
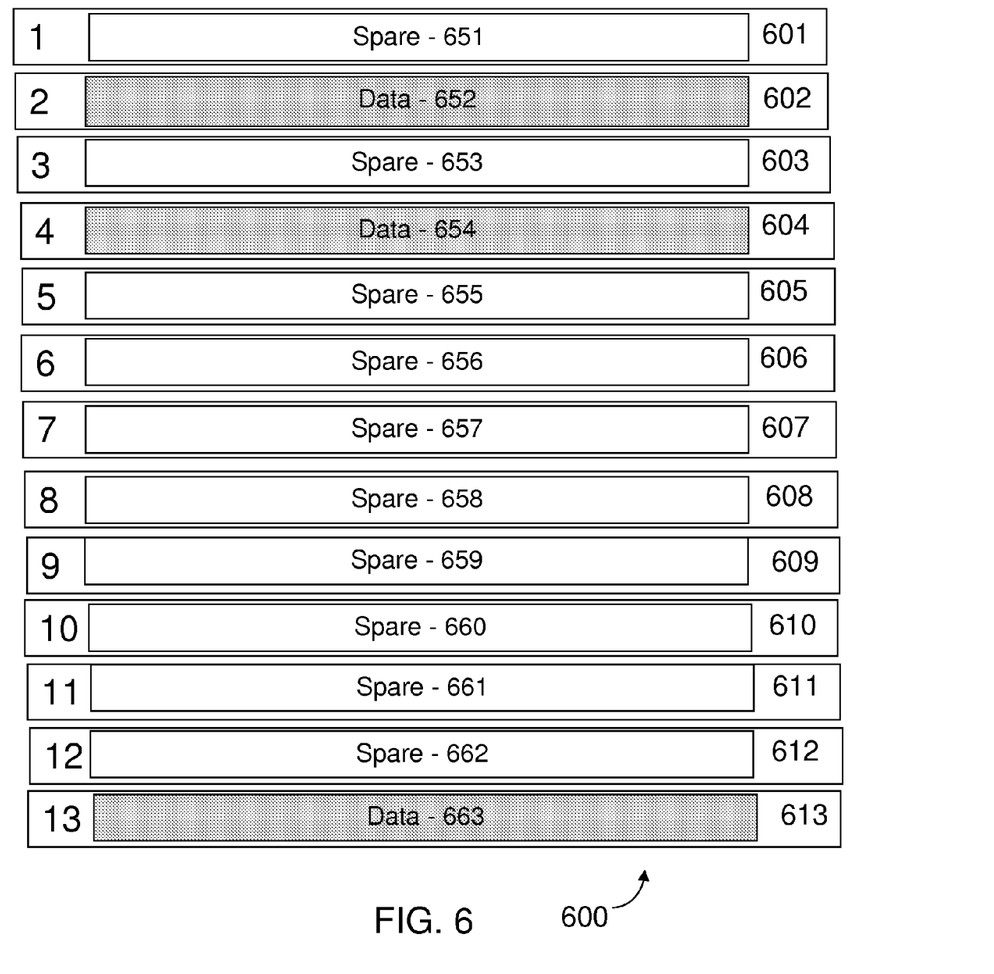
FIG. 6 is a schematic diagram of an improved writing process according to an embodiment of the invention showing pre-existing data.

FIG. 6 is a schematic diagram 600 of an improved writing process according to embodiments of the present invention showing pre-existing data. Spare data blocks 651, 653, and 655-662 are shown, along with blocks 652, 654 and 663 which contain previously-stored data which is not rewritten during the time frame of FIG. 6. FIG. 6 represents the condition of the data storage medium prior to the write operations illustrated in FIGS. 7-9.

Figure 9:
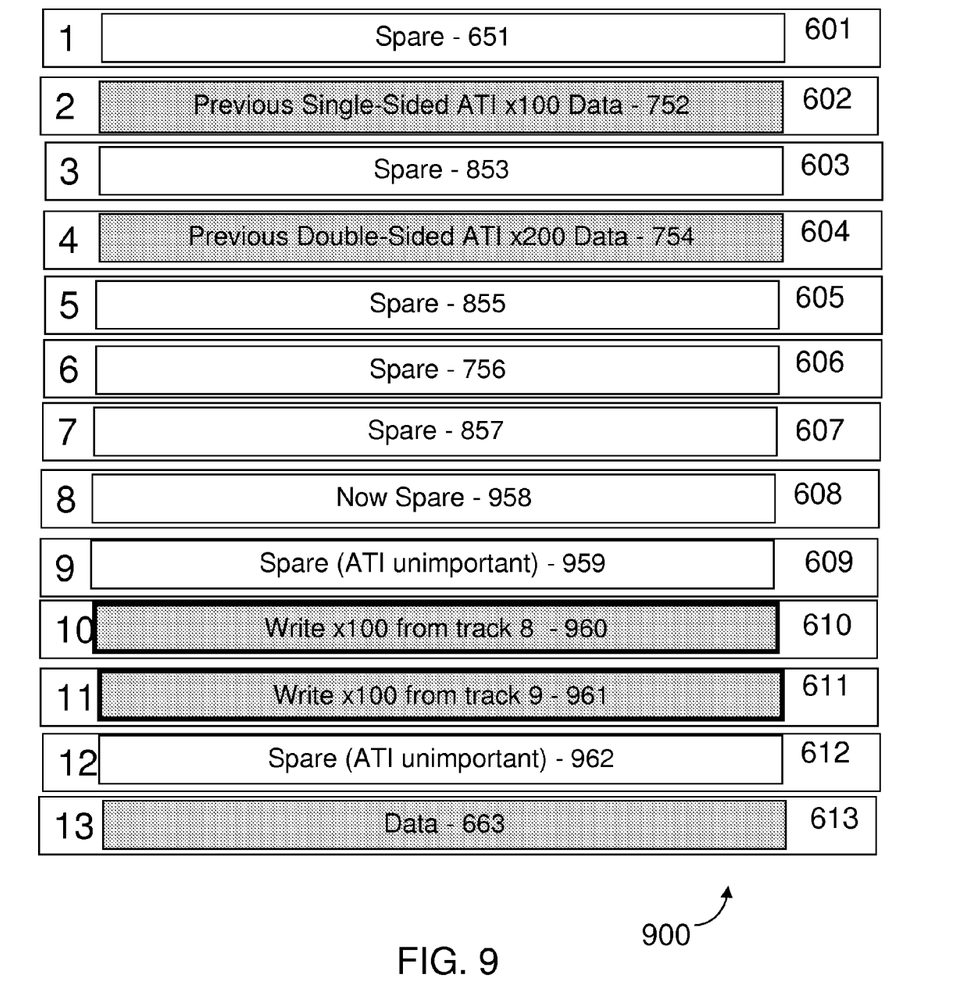
FIG. 9 is a schematic diagram of the improved writing process from FIG. 8 showing minimized ATI effects on the pre-existing data.

FIGS. 7-9 are time-sequential schematic diagrams 700, 800, and 900, respectively, of an improved writing process according to embodiments of the present invention showing no loss of pre-existing data due to ATI effects.

FIG. 7 shows "Spare" data blocks 651, 756, and 657-662, as well as blocks 752, 754 and 663 containing previously-stored data which is not rewritten within the time period represented by FIG. 7. Data blocks 753 and 755 are both written a hundred times ("×100") within the time period of FIG. 7, inducing partial ATI erasing of the data in block 752. For block 752, this ATI effect is "single-sided", since the other neighboring block to block 752, i.e. block 651, is not being written. Block 754, however, experiences twice as much ATI (double-sided ATI) since both its neighboring blocks 753 and 755 are being written. However, by limiting the total number of writes in blocks 753 and 755 to a hundred cycles, the degree of ATI erasing in block 754 may still be kept to acceptable levels, i.e., to levels which do not induce the need for significantly higher levels of ECC error bit use. Block 756 also has single-sided ATI effects due to the writing of block 755, however since there is no prewritten data in spare block 756 (i.e., it has not been mapped to an LBA by the indirection system), this ATI is unimportant as shown. None of the other data blocks in FIG. 7 are affected by ATI during the time period of FIG. 7.

FIG. 8 is a schematic diagram 800 of the improved writing process of FIG. 7 showing no loss of pre-existing data due to ATI effects at a later time period than the time period illustrated in FIG. 7. After the hundred writes into blocks 753 and 755 illustrated in FIG. 7, the indirection system has remapped the LBAs previously associated with blocks 753 and 755 to data blocks 858 and 859, respectively, as shown. Thus blocks 752 and 754 no longer experience ATI erasing and remain unaffected, thus retaining the same block labels, 752 and 754, through the remainder of FIG. 8. The indirection system in this example was able to locate two spare blocks in FIG. 7—blocks 658 and 659 which neighbor on other spare blocks (blocks 657 and 660, respectively). Therefore data writing into blocks 858 and 859 in FIG. 8 will not induce the ATI erasure of any prewritten data, unlike the situation in FIG. 7. Although FIG. 8 shows the indirection system limiting the number of writes to blocks 858 and 859 to a hundred write cycles, this is less important or even unnecessary in this case. Note that ATI effects from the writing of block 858 on block 859, and the similar ATI effects from the writing of block 859 on block 858, are not significant since both blocks 858 and 859 are being repeatedly rewritten (i.e., the LBAs which were mapped to these two blocks are receiving repeated write commands).

FIG. 9 is a schematic diagram 900 of the improved writing process of FIG. 8 showing no loss of pre-existing data due to ATI effects at a later time period than the time period illustrated in FIG. 8. After the hundred writes into blocks 858 and 859 illustrated in FIG. 8, the indirection system has remapped the LBAs previously associated with blocks 858 and 859 to data blocks 960 and 961, respectively, as shown. As for FIG. 8, the indirection system in this example was able to locate two spare blocks in FIG. 8—blocks 860 and 861 which neighbor on blocks which are either already spare (i.e., block 662) or which will become spare after remapping of their associated LBAs (i.e., block 859). Therefore data writing into blocks 960 and 961 will also not induce the ATI erasure of any prewritten data, as was the case in FIG. 8, but not in FIG. 7. Thus although FIG. 9 shows the indirection system limiting the number of writes to blocks 960 and 961 to a hundred write cycles, this is less important or even unnecessary in this case. Note that ATI effects from the writing of block 960 on block 961, and the similar ATI effects from the writing of block 961 on block 960, are not significant since both blocks 960 and 961 are being repeatedly rewritten (i.e., the LBAs which were mapped to these two blocks are receiving repeated write commands).

Implementation of a Method

The method may be implemented using the pre-existing indirection system of the HDD. The indirection system is used to map logical block addresses (LBAs) to physical addresses (tracks and sector numbers) on the physical disk surface (e.g., surface 124 in FIG. 1). The method can employ a write counter for each data block to keep track of the number of write cycles at that physical location. Note that the method may concern the physical locations of data blocks, since ATI effects occur between neighboring physical data blocks (on neighboring tracks), and are independent of the LBA addresses. However the method can employ remapping of LBAs to effect the reduction or elimination of ATI effects between physical data blocks.

Alternative Embodiments

Although embodiments have been described in the context of hard disk drives, it should be understood that various changes, substitutions and alterations can be made. Moreover, the scope of the present application is not intended to be limited to the particular embodiments of the process, machine, manufacture, or composition of matter, means, methods and steps described in the specification. As one of ordinary skill in the art will readily appreciate from the disclosure of embodiments, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for reducing adjacent track interference effects in a data storage system, comprising the steps of:
    configuring the data storage system with:
        a hard drive data storage device comprising a rotating data storage medium, wherein the data storage medium comprises a multiplicity of data tracks, and wherein each data track comprises a multiplicity of data blocks;
        a write head for storing data in data blocks;
        a read head for reading data from the data blocks written by the write head; and
        storage for an array of write cycle counters, comprising one counter for each data block; and
    executing an algorithm for writing data to the data blocks comprising the steps of:
        initializing the write cycle counters to zero;
        receiving a data block to be written to the data storage device at a first data block location;
        incrementing the write cycle counter for the first data block location by one;
        comparing the value of the write cycle counter of the first data block location to a predetermined maximum adjacent track interference (ATI) limit count, wherein:
            if the write cycle counter of the first data block location exceeds the predetermined maximum ATI limit count, then:
                locating a second data block location on the data storage device;
                writing the data to the second data block location; and
                resetting the write cycle counters of the first and second data block locations; and
        returning to the receiving a data block to be written step.

2. The method of claim 1, wherein the step of locating a second data block location on the data storage device comprises locating a data block location with at least one adjacent spare data block.

3. The method of claim 1, wherein the predetermined maximum ATI limit count is set to a value substantially less than the number of ATI events which would induce substantial ATI effects on an adjacent data block.

4. The method of claim 1, wherein the predetermined maximum ATI limit count is no larger than 200.

5. The method of claim 1, wherein the predetermined maximum ATI limit count is no larger than 50.

6. The method of claim 1, wherein the predetermined maximum ATI limit count is no larger than 10.

7. A method for reducing adjacent track interference effects in a data storage system, comprising the steps of:
    configuring the data storage system with:
        a hard drive data storage device comprising a rotating data storage medium, wherein the data storage medium comprises a multiplicity of data tracks, and wherein each data track comprises a multiplicity of data blocks;
        a write head for storing data in data blocks;
        a read head for reading data from the data blocks written by the write head; and
        storage for an array of write cycle counters, comprising one counter for each data block; and
    executing an algorithm for writing data to data blocks comprising the steps of:
        initializing the write cycle counters to zero;
        receiving a data block to be written to the data storage device at a first data block location;

incrementing the write cycle counter for the first data block location by one;

comparing the value of the write cycle counter of the first data block location to a predetermined maximum adjacent track interference (ATI) limit count, wherein the predetermined maximum ATI limit count is set to a value substantially less than the number of ATI events which would induce substantial ATI effects on a data block, and wherein:

if the write cycle counter of the first data block location exceeds the predetermined maximum ATI limit count, then:

locating a second data block location on the data storage device, wherein the step of locating a second data block location on the data storage device comprises locating a data block location with at least one adjacent spare data block;

writing the data to the second data block location; and         resetting the write cycle counter of the second data block location; and returning to the receiving a data block to be written step.

8. The method of claim 7, wherein the predetermined maximum ATI limit count is no larger than 200.

9. The method of claim 7, wherein the predetermined maximum ATI limit count is no larger than 50.

10. The method of claim 7, wherein the predetermined maximum ATI limit count is no larger than 10.

* * * * *